United States Patent
Mehta

(10) Patent No.: US 10,883,832 B2
(45) Date of Patent: Jan. 5, 2021

(54) CAPACITY BASED VEHICLE OPERATION

(71) Applicant: UATC, LLC, San Francisco, CA (US)

(72) Inventor: Sisil Mehta, Berkeley, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/727,332

(22) Filed: Dec. 26, 2019

(65) Prior Publication Data
US 2020/0132469 A1 Apr. 30, 2020

Related U.S. Application Data

(63) Continuation of application No. 15/654,200, filed on Jul. 19, 2017, now Pat. No. 10,527,428.

(51) Int. Cl.
| | | |
|---|---|---|
| *G06F 17/10* | (2006.01) | |
| *G06G 7/48* | (2006.01) | |
| *G01C 21/20* | (2006.01) | |
| *G06Q 10/04* | (2012.01) | |
| *G06Q 10/06* | (2012.01) | |
| *G06Q 10/08* | (2012.01) | |
| *G05D 1/00* | (2006.01) | |

(52) U.S. Cl.
CPC ........... *G01C 21/20* (2013.01); *G05D 1/0027* (2013.01); *G06Q 10/047* (2013.01); *G06Q 10/06312* (2013.01); *G06Q 10/08* (2013.01); *G05D 2201/0212* (2013.01)

(58) Field of Classification Search
CPC ................. G01C 21/20; G05D 1/0027; G05D 2201/0212; G06Q 10/047; G06Q 10/06312; G06Q 10/08

See application file for complete search history.

(56) References Cited

U.S. PATENT DOCUMENTS

| | | | | |
|---|---|---|---|---|
| 8,527,146 | B1* | 9/2013 | Jackson | B60W 50/0098 701/36 |
| 2007/0188348 | A1* | 8/2007 | Bauer | G08G 1/162 340/905 |
| 2014/0333769 | A1* | 11/2014 | Shibuya | H04N 7/183 348/148 |
| 2015/0228192 | A1* | 8/2015 | Kawamoto | G08G 1/127 701/537 |
| 2016/0078576 | A1* | 3/2016 | Su | G08G 1/127 705/7.12 |
| 2018/0143628 | A1* | 5/2018 | Samper | B60W 30/18027 |
| 2018/0208208 | A1* | 7/2018 | Chen | B60R 16/037 |
| 2018/0299883 | A1* | 10/2018 | Terzian | G09F 27/00 |

* cited by examiner

*Primary Examiner* — Harry Y Oh

(74) *Attorney, Agent, or Firm* — Dority & Manning, P.A.

(57) ABSTRACT

Systems, methods, and vehicles for capacity based vehicle operation are provided. For example, a method can include receiving, by a computing system including one or more computing devices, object data based in part on one or more states of one or more objects. Based in part on the object data, the computing system can determine one or more features of the one or more objects. Based on a comparison of the one or more features of the one or more objects to a vehicle capacity criterion, the one or more objects that satisfy the vehicle capacity criterion can be determined. The vehicle capacity criterion can be based in part on a carrying capacity of an autonomous vehicle. In response to the one or more objects satisfying the vehicle capacity criterion, one or more control systems associated with operation of the autonomous vehicle can be activated by the computing system.

20 Claims, 7 Drawing Sheets

CAPACITY BASED VEHICLE OPERATION

RELATED APPLICATION

The present application is based on and claims benefit of U.S. application Ser. No. 15/654,200 having a filing date of Jul. 19, 2017, which is incorporated by reference herein.

FIELD

The present disclosure relates generally to operation of an autonomous vehicle which can be based on a capacity of the autonomous vehicle.

BACKGROUND

Vehicles, including autonomous vehicles, can be equipped with a variety of vehicle control systems that can be used to operate the vehicle. The vehicle control systems can be coupled with a variety of sensors that allow the autonomous vehicle to perform activities including navigating its environment. However, the environment in which the autonomous vehicle operates can vary over time, as can the ways in which the autonomous vehicle is operated within that environment. As such, there exists a need for an autonomous vehicle that is able to effectively adapt to its environment and the demands placed upon the autonomous vehicle by that environment.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of operating an autonomous vehicle. The computer-implemented method of operating an autonomous vehicle can include receiving, by a computing system comprising one or more computing devices, object data based in part on one or more states of one or more objects. The method can further include determining, by the computing system, based in part on the object data, one or more features of the one or more objects. The method can further include, determining, by the computing system, based on a comparison of the one or more features of the one or more objects one or more vehicle capacity criteria, that the one or more objects satisfy the one or more vehicle capacity criteria, wherein the one or more vehicle capacity criteria are based in part on a carrying capacity of an autonomous vehicle. The method can also include, responsive to the one or more objects satisfying the one or more vehicle capacity criteria, activating, by the computing system, one or more control systems associated with operation of the autonomous vehicle.

Another example aspect of the present disclosure is directed to one or more tangible, non-transitory computer-readable media storing computer-readable instructions that when executed by one or more processors cause the one or more processors to perform operations. The operations can include receiving object data based in part on one or more states of one or more objects. The operations can further include determining, based in part on the object data, one or more features of the one or more objects. The operations can further include, determining, based on a comparison of the one or more features of the one or more objects to one or more vehicle capacity criteria, that the one or more objects satisfy the one or more vehicle capacity criteria, wherein the one or more vehicle capacity criteria are based in part on a carrying capacity of an autonomous vehicle. The operations can also include, responsive to the one or more objects satisfying the one or more vehicle capacity criteria, activating, one or more control systems associated with operation of the autonomous vehicle.

Another example aspect of the present disclosure is directed to an autonomous vehicle comprising one or more processors and one or more non-transitory computer-readable media storing instructions that when executed by the one or more processors cause the one or more processors to perform operations. The operations can include receiving object data based in part on one or more states of one or more objects. The operations can further include determining, based in part on the object data, one or more features of the one or more objects. The operations can further include, determining, based on a comparison of the one or more features of the one or more objects to one or more vehicle capacity criteria, that the one or more objects satisfy the one or more vehicle capacity criteria, wherein the one or more vehicle capacity criteria are based in part on a carrying capacity of an autonomous vehicle. The operations can also include, responsive to the one or more objects satisfying the one or more vehicle capacity criteria, activating, one or more control systems associated with operation of the autonomous vehicle.

Other example aspects of the present disclosure are directed to other systems, methods, vehicles, apparatuses, tangible non-transitory computer-readable media, and devices for capacity based vehicle operation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
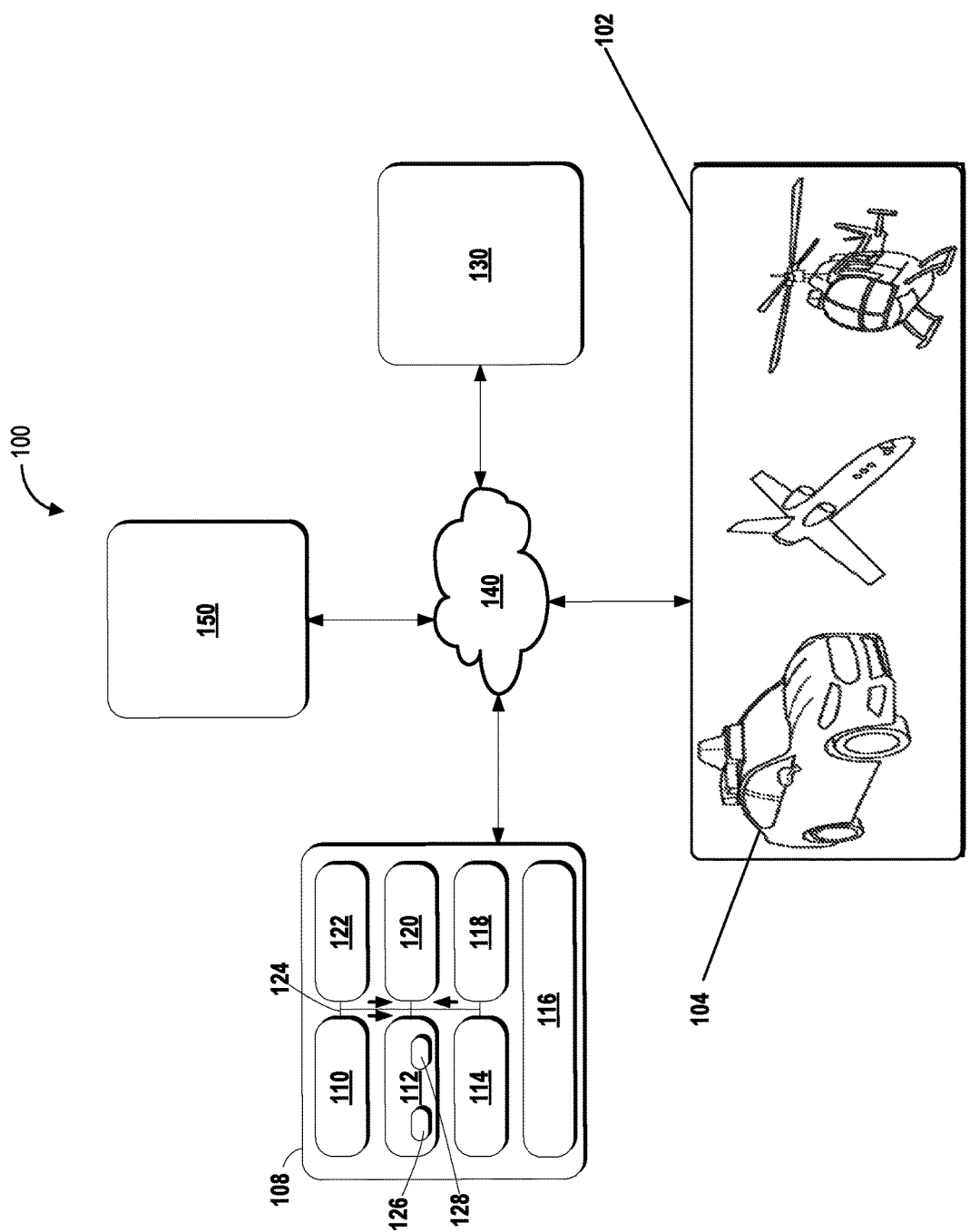
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to the operation of a vehicle including an autonomous vehicle, a semi-autonomous vehicle, or a manually driven vehicle. The operation of the vehicle can be based on the carrying capacity of the vehicle (e.g., a maximum weight the vehicle can safely carry) in relation to features or characteristics of one or more objects (e.g., the weight, mass, or volume of passengers or cargo) associated with the vehicle. For example, the autonomous vehicle can include one or more sensors (e.g., a sensor suite of one or more different sensors) that can detect the environment inside the autonomous vehicle and external to the autonomous vehicle. In particular, the one or more sensors can be used to determine the state (e.g., characteristics) of the vehicle and objects external to the vehicle. For example, based on changes in the state of the environment, the one or more sensors can generate signals or data that can be used determine the number of passengers outside a vehicle or the total mass or weight of passengers inside the vehicle. Further, the vehicle can include a vehicle computing system that can control various vehicle systems and components including notification systems (e.g., systems that provide instructions to passengers) and vehicle access systems such as those used to regulate access into or from the vehicle (e.g., systems that control locking or unlocking vehicle doors).

The vehicle control system can be used to perform actions (e.g., opening vehicle doors or activating vehicle cabin lights) based on a comparison between a determined quantity (e.g., an estimated mass, weight, or volume based on data from sensors) of one or more objects external to the vehicle and a carrying capacity of the vehicle. Further, the disclosed technology can adjust the available carrying capacity of the vehicle based on the state of the passengers or the state of a route the vehicle will travel. In this way, the disclosed technology can dynamically perform actions so that passengers or other objects entering the vehicle do not exceed the vehicle's carrying capacity.

The vehicle control system can process or generate data, including data based on signals or data received from various vehicle systems or vehicle components. Furthermore, the vehicle control system can exchange (send or receive) signals or data with various systems or components inside the vehicle and external to the vehicle. For example, the vehicle control system can exchange signals or data with vehicle systems including sensor systems (e.g., optical sensors, audio sensors, or tactile sensors), communication systems (e.g., wireless communication systems), navigation systems (e.g., GPS or other systems used to determine a vehicle's location), notification systems (e.g., touch-screen LCD displays or loudspeakers), propulsion systems (e.g., engines), and vehicle access systems (e.g., used to control access through doors or windows).

The vehicle control system can receive object data based in part on one or more states of one or more objects including potential passengers or cargo. For example, the object data can include indications of various states or conditions of the potential passengers or cargo that can be associated with the vehicle. The object data can describe physical properties or identifiers associated with the potential passengers or cargo. The physical properties can be associated with various aspects of the potential passengers or cargo including appearance, sound, mass, or weight. The identifiers can be associated with aspects of the passengers or cargo including physical properties, names, or data associated with the passengers or cargo (e.g., authentication or access codes). The object data can be based on outputs including sensor output from one or more sensors of the vehicle. The sensors can detect the state of the environment inside and outside the vehicle and can include an optical sensor including a light detection and ranging device (LIDAR); an audio sensor, a pressure sensor; a mass sensor; a weight sensor; a tactile sensor; a temperature sensor; or an electromagnetic sensor. Additionally, the object data can be based on access output (e.g., a passcode) from a vehicle access system (e.g., a security device requiring the passcode to unlock a vehicle door). Further, the vehicle access system can include a human-computer interface system that can receive input related to the identity or characteristics of the passengers or cargo. For example, the vehicle can include an interface for user input that can be used to enter the identity of a passenger in order to gain entry into the vehicle. Object data can also be received from other systems including remote computing devices (e.g., data received from a remote server device through a computer network).

The vehicle control system can determine, based in part on the object data, one or more features of the one or more objects. Features of the one or more objects can include any portion of the object data, including combinations of portions of the object data. The vehicle control system can process the object data including generating inferences, estimates, or predictions based on the object data, which can then be used to generate the one or more features of the one or more objects. In other words, the vehicle control system can infer, estimate, or predict physical properties of the passengers or cargo based on the object data. For example, the vehicle control system can determine the mass or weight or number of passengers or cargo based on the appearance of the passenger or cargo obtained from an image capture device. As such, the vehicle control system can determine one type of physical property (e.g., mass or weight) based on another type of physical property (e.g., appearance)

The vehicle control system can determine, based on a comparison of the one or more features of the one or more objects to one or more vehicle capacity criteria, whether the one or more objects satisfy the one or more vehicle capacity criteria. The one or more vehicle capacity criteria can be used to determine whether a quantity (e.g., mass, weight, or volume) of one or more objects (e.g., passengers or cargo) can be carried by the vehicle. The one or more vehicle capacity criteria can be based on the one or more features of the one or more objects, including physical properties of the one or more objects or electronic features (e.g., a passcode to gain access to the vehicle). For example, the one or more features or the one or more vehicle capacity criteria can include a number of the one or more objects (i.e., how many of the one or more objects there are), one or more identities of the one or more objects, a weight or mass of the one or more objects, a distribution throughout the vehicle of the weight or mass of the one or more objects, a volume of the one or more objects, an electrostatic capacitance of the one or more objects, or a shape of the one or more objects.

In response to the one or more objects satisfying the one or more vehicle capacity criteria, the vehicle control system can activate one or more control systems associated with operation of the vehicle including activating a vehicle access system; a vehicle notification system including visual, audio, or tactile notifications; a vehicle communication system; or a vehicle propulsion system. For example, activating control systems associated with operation of the vehicle can include opening, closing, locking, or unlocking vehicle entrances (e.g., passenger doors, windows, or trunk doors); initiating travel of the vehicle to a destination location; or generating a visual, audio, or tactile indication (e.g., activating a light on a seat to indicate an available vehicle seat to a passenger).

In some implementations, activating the vehicle access system can include determining whether a spatial relationship (e.g., a distance or relative position) between the one or more objects, an entrance to the vehicle (e.g., a door or window), or a loading location (e.g., a loading zone for cargo, a sidewalk area where passengers are waiting) external to the vehicle satisfies one or more access criteria. The one or more access criteria may be based, in part, on a threshold distance between the entrance and the loading location, a threshold distance between the entrance and the one or more objects, or an orientation of the entrance relative to the loading location. For example, the one or more access criteria can require a particular orientation of a vehicle entrance (e.g., door) so that it is adjacent to a sidewalk can be used to ensure that passengers can only enter the vehicle from the sidewalk and not from a busy street.

In response to the spatial relationship satisfying the one or more access criteria, access to the vehicle can be modified. Modifying access to the vehicle can be based on actions that limit or facilitate access to the vehicle include locking the entrance, unlocking the entrance, opening the entrance, closing the entrance, activating a passenger restraint system (e.g., seatbelt), or deactivating a passenger restraint system.

To better accommodate a variety of external circumstances, the vehicle can receive data including capacity adjustment data that can be used to adjust the one or more vehicle capacity criteria. For example, the vehicle can receive capacity adjustment data that comprises a route for the vehicle to travel, topographical conditions (e.g., elevation changes), road conditions (e.g., conditions of the road surface), or weather conditions along the route. The capacity adjustment data can be received from various sources including local sources (e.g., onboard sensors of the vehicle) and remote sources (e.g., remote weather monitoring servers). The vehicle control system can modify the one or more vehicle capacity criteria based on the capacity adjustment data. For example, capacity adjustment data indicating heavy rainfall or snowfall can be used to reduce the maximum weight allowable under the one or more vehicle capacity criteria.

The vehicle control system can determine, based in part on the one or more features, one or more identities and corresponding object locations of the one or more objects. The one or more features can include unique identifiers (e.g., fingerprint) or general types (e.g., adult) that can be used to determine the one or more identities (e.g., personal names) associated with the one or more objects. The corresponding object locations can include the location (e.g., an absolute location or a relative location) of the one or more objects associated with the corresponding one or more identities. For example, the vehicle control system can determine the names and locations, relative to the vehicle, of three awaiting passengers.

The vehicle control system can generate, based in part on one or more object placement criteria, the one or more identities, and the corresponding object locations, one or more placement indications comprising instructions for directing movement of the one or more objects to one or more assigned locations in the vehicle. The one or more object placement criteria can include various criteria for the location of the one or more objects inside a vehicle including where passengers or cargo are to be located relative to the vehicle or to other passengers or cargo. For example, the vehicle control system can provide audio instructions in the form of spoken directions of where in the vehicle an identified passenger should sit.

In some implementations, the one or more object placement criteria can be based in part on the order of ingress or egress for the one or more objects. As such, the vehicle control system can determine, based on the one or more identities and corresponding object locations, an order of ingress or egress for the one or more objects. For example, the one or more object placement criteria can be established so that adults exit the vehicle first in order to assist minors exiting the vehicle afterwards. In this way, the vehicle control system can facilitate more convenient, and safe, entry or exit from the vehicle.

The systems, methods, and devices in the disclosed technology can provide a variety of technical effects and benefits. For example, the disclosed technology can offer enhanced operational safety by regulating the amount (e.g., mass, weight, or number) of passengers or cargo that are in a vehicle. Regulation of the amount of passengers or cargo can be performed through comparison to a vehicle carrying capacity threshold, thereby avoiding instances of overcrowding or overloading of available vehicle carrying space. Further, by adjusting the load carried by the vehicle in response to environmental conditions (e.g., snow or rain), performance characteristics of the vehicle can be improved, which can result in safer vehicle handling, braking, or acceleration.

Further, the disclosed technology can improve the operation of the vehicle itself by regulating the load on the vehicle. Preventing situations in which the vehicle's carrying capacity is exceeded can result in less wear and tear on various vehicle components and systems. For example, regulating the load can result in less engine strain, thereby leading to less engine maintenance. Further, by regulating the load on the vehicle, the risk of component failure, especially catastrophic component failure, can be significantly reduced. Additionally, by maintaining loads within a designated vehicle carrying capacity, the vehicle can realize the benefit of improved fuel efficiency.

By determining, in advance of passengers or cargo entering the vehicle, an available vehicle capacity, the disclosed technology can reduce down-time that results from inefficient loading or off-loading of passengers or cargo at a loading location. For example, a vehicle with capacity for one additional passenger can send a signal to dispatch additional vehicles to the pick-up location to accommodate additional passengers that may be waiting at a pick-up location.

Additionally, the disclosed technology can improve the safety of passengers or cargo by regulating conditions inside the vehicle including improved placement of passengers or cargo inside the vehicle. For example, the disclosed technology can improve operation of the vehicle by reducing the occurrence of situations in which passengers are not safely situated within the vehicle (e.g., passengers seated on the laps of other passengers). Further, the determination of passenger or cargo locations within a vehicle cabin can facilitate safer pick-up or drop-off of passengers or cargo by aligning entryways with safer loading locations (e.g., entering the vehicle via a sidewalk instead of via a busy street).

Accordingly, the disclosed technology provides more effective use of a vehicle's available capacity through improvements in safety and efficiency as well as improved operation of the vehicle by way of better handling and reduced wear and tear on vehicle components.

With reference now to FIGS. 1-8, example embodiments of the present disclosure will be discussed in further detail. FIG. 1 depicts a diagram of an example system 100 according to example embodiments of the present disclosure. The system 100 can include a plurality of vehicles 102; a vehicle 104; a vehicle computing system 108 that includes one or more computing devices 110; one or more data acquisition systems 112; an autonomy system 114; one or more control systems 116; one or more human machine interface systems 118; other vehicle systems 120; a communications system 122; a network 124; one or more image capture devices 126; one or more sensors 128; one or more remote computing devices 130; a communication network 140; and an operations computing system 150.

The operations computing system 150 can be associated with a service provider that provides one or more vehicle services to a plurality of users via a fleet of vehicles that includes, for example, the vehicle 104. The vehicle services can include transportation services (e.g., rideshare services), courier services, delivery services, and/or other types of services.

The operations computing system 150 can include multiple components for performing various operations and functions. For example, the operations computing system 150 can include and/or otherwise be associated with one or more remote computing devices that are remote from the vehicle 104. The one or more remote computing devices can include one or more processors and one or more memory devices. The one or more memory devices can store instructions that when executed by the one or more processors cause the one or more processors to perform operations and functions associated with operation of the vehicle including determination of the state of one or more objects external to and inside the vehicle, and comparison of the state of the one or more objects to one or more vehicle carrying capacity criteria associated with the carrying capacity of the vehicle.

For example, the operations computing system 150 can be configured to monitor and communicate with the vehicle 104 and/or its users to coordinate a vehicle service provided by the vehicle 104. To do so, the operations computing system 150 can manage a database that includes data including vehicle status data associated with the status of vehicles including the vehicle 104. The vehicle status data can include a location of the plurality of vehicles 102 (e.g., a latitude and longitude of a vehicle), the availability of a vehicle (e.g., whether a vehicle is available to pick-up or drop-off passengers or cargo), or the carrying capacity of a vehicle (e.g., the mass, weight, or volume, of passengers or cargo that a vehicle can carry).

An indication, record, and/or other data indicative of the state of the one or more objects or the carrying capacity of the vehicle 104 can be stored locally in one or more memory devices of the vehicle 104. Additionally, or alternatively, the vehicle 104 can provide data indicative of the state of the one or more objects or the carrying capacity of the vehicle 104 to the operations computing system 150, which can store an indication, record, and/or other data indicative of the state of the one or more objects or the carrying capacity of the vehicle 104 in one or more memory devices associated with the operations computing system 150 (e.g., remote from the vehicle).

The operations computing system 150 can communicate with the vehicle 104 via one or more communications networks including the communications network 140. The communications network 140 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SAT-COM network, VHF network, a HF network, a WiMAX based network, and/or any other suitable communications network (or combination thereof) for transmitting data to and/or from the vehicle 104.

The vehicle 104 can be a ground-based vehicle (e.g., an automobile), an aircraft, and/or another type of vehicle. The vehicle 104 can be an autonomous vehicle that can drive, navigate, operate, etc. with minimal and/or no interaction from a human driver. The autonomous vehicle 104 can be configured to operate in one or more modes such as, for example, a fully autonomous operational mode, a semi-autonomous operational mode, a park mode, a sleep mode, etc. A fully autonomous (e.g., self-driving) operational mode can be one in which the vehicle 104 can provide driving and navigational operation with minimal and/or no interaction from a human driver present in the vehicle. A semi-autonomous operational mode can be one in which the vehicle 104 can operate with some interaction from a human driver present in the vehicle. Park and/or sleep modes can be used between operational modes while the vehicle 104 waits to provide a subsequent vehicle service, recharges between operational modes, etc.

The vehicle 104 can include a vehicle computing system 108. The vehicle computing system 108 can include various components for performing various operations and functions. For example, the vehicle computing system 108 can include one or more computing devices 110 on-board the vehicle 104. The one or more computing devices 110 can include one or more processors and one or more memory devices, each of which are on-board the vehicle 104. The one or more memory devices can store instructions that when executed by the one or more processors cause the one or more processors to perform operations and functions, such as those taking the vehicle 104 out-of-service, stopping the motion of the vehicle 104, determining the carrying capacity of the vehicle 104, or generating indications associated with the loading or unloading of passengers or cargo to the vehicle 104, as described herein.

The one or more computing devices 110 can implement, include, and/or otherwise be associated with various other systems on-board the vehicle 104. The one or more computing devices 110 can be configured to communicate with these other on-board systems of the vehicle 104. For instance, the one or more computing devices 110 can be configured to communicate with one or more data acquisition systems 112, an autonomy system 114 (e.g., including a navigation system), one or more control systems 116, one or more human machine interface systems 118, other vehicle systems 120, and/or a communications system 122. The one or more computing devices 110 can be configured to communicate with these systems via a network 124. The network 124 can include one or more data buses (e.g., controller area network (CAN)), on-board diagnostics connector (e.g., OBD-II), and/or a combination of wired and/or wireless communication links. The one or more computing devices 110 and/or the other on-board systems can send and/or receive data, messages, signals, etc. amongst one another via the network 124.

The one or more data acquisition systems 112 can include various devices configured to acquire data associated with the vehicle 104. This can include data associated with one or more of the vehicle's systems (e.g., health data), the vehicle's interior, the vehicle's exterior, the vehicle's surroundings, the vehicle users, etc. The one or more data acquisition systems 112 can include, for example, one or more image capture devices 126. The one or more image capture devices 126 can include one or more cameras, LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The one or more image capture devices 126 can be located in the interior and/or on the exterior of the vehicle 104. The one or more image capture devices 126 can be configured to acquire image data to be used for operation of the vehicle 104 in an autonomous mode. For example, the one or more image capture devices 126 can acquire image data to allow the vehicle 104 to implement one or more machine vision techniques (e.g., to detect objects in the surrounding environment).

Additionally, or alternatively, the one or more data acquisition systems 112 can include one or more sensors 128. The one or more sensors 128 can include impact sensors, motion sensors, pressure sensors, mass sensors, weight sensors, volume sensors (e.g., sensors that can determine the volume of an object in liters), temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameters associated with the vehicle 104 and/or relevant to the operation of the vehicle 104. The one or more data acquisition systems 112 can include the one or more sensors 128 dedicated to obtaining data associated with a particular aspect of the vehicle 104, such as, the vehicle's fuel tank, engine, oil compartment, wipers, etc. The one or more sensors 128 can also, or alternatively, include sensors associated with one or more mechanical and/or electrical components of the vehicle 104. For example, the one or more sensors 128 can be configured to detect whether a vehicle door, trunk, gas cap, etc. is in an open or closed position. In some implementations, the data acquired by the one or more sensors 128 can help detect other vehicles and/or objects, road conditions (e.g., curves, potholes, dips, bumps, changes in grade), measure a distance between the vehicle 104 and other vehicles and/or objects, etc.

The vehicle computing system 108 can also be configured to obtain map data. For instance, a computing device of the vehicle (e.g., within the autonomy system 114) can be configured to receive map data from one or more remote computing device including the operations computing system 150 or the one or more remote computing devices 130 (e.g., associated with a geographic mapping service provider). The map data can include any combination of two-dimensional or three-dimensional geographic map data associated with the area in which the vehicle was, is, or will be travelling.

The data acquired from the one or more data acquisition systems 112, the map data, and/or other data can be stored in one or more memory devices on-board the vehicle 104. The on-board memory devices can have limited storage capacity. As such, the data stored in the one or more memory devices may need to be periodically removed, deleted, and/or downloaded to another memory device (e.g., a database of the service provider). The one or more computing devices 110 can be configured to monitor the memory devices, and/or otherwise communicate with an associated processor, to determine how much available data storage is in the one or more memory devices. Additionally, or alternatively, one or more of the other on-board systems (e.g., the autonomy system 114) can be configured to access the data stored in the one or more memory devices.

The autonomy system 114 can be configured to allow the vehicle 104 to operate in an autonomous mode. For instance, the autonomy system 114 can obtain the data associated with the vehicle 104 (e.g., acquired by the one or more data acquisition systems 112). The autonomy system 114 can also obtain the map data. The autonomy system 114 can control various functions of the vehicle 104 based, at least in part, on the acquired data associated with the vehicle 104 and/or the map data to implement the autonomous mode. For example, the autonomy system 114 can include various models to perceive road features, signage, and/or objects, people, animals, etc. based on the data acquired by the one or more data acquisition systems 112, map data, and/or other data. In some implementations, the autonomy system 114 can include machine-learned models that use the data acquired by the one or more data acquisition systems 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 104 and other vehicles or objects, etc. The autonomy system 114 can be configured to predict the position and/or movement (or lack thereof) of such elements (e.g., using one or more odometry techniques). The autonomy system 114 can be configured to plan the motion of the vehicle 104 based, at least in part, on such predictions. The autonomy system 114 can implement the planned motion to appropriately navigate the vehicle 104 with minimal or no human intervention. For instance, the autonomy system 114 can include a navigation system configured to direct the vehicle 104 to a destination location. The autonomy system 114 can regulate vehicle speed, acceleration, deceleration, steering, and/or operation of other components to operate in an autonomous mode to travel to such a destination location.

The autonomy system 114 can determine a position and/or route for the vehicle 104 in real-time and/or near real-time. For instance, using acquired data, the autonomy system 114 can calculate one or more different potential routes (e.g., every fraction of a second). The autonomy system 114 can then select which route to take and cause the vehicle 104 to navigate accordingly. By way of example, the autonomy system 114 can calculate one or more different straight paths (e.g., including some in different parts of a current lane), one or more lane-change paths, one or more turning paths, and/or one or more stopping paths. The vehicle 104 can select a path based, at last in part, on acquired data, current traffic factors, travelling conditions associated with the vehicle 104, etc. In some implementations, different weights can be applied to different criteria when selecting a path. Once selected, the autonomy system 114 can cause the vehicle 104 to travel according to the selected path.

The one or more control systems 116 of the vehicle 104 can be configured to control one or more aspects of the vehicle 104. For example, the one or more control systems 116 can control one or more access points of the vehicle 104. The one or more access points can include features such as the vehicle's door locks, trunk lock, hood lock, fuel tank access, latches, and/or other mechanical access features that can be adjusted between one or more states, positions, locations, etc. For example, the one or more control systems 116 can be configured to control an access point (e.g., door lock) to adjust the access point between a first state (e.g., lock position) and a second state (e.g., unlocked position). Additionally, or alternatively, the one or more control systems 116 can be configured to control one or more other electrical features of the vehicle 104 that can be adjusted between one or more states. For example, the one or more control systems 116 can be configured to control one or more electrical features (e.g., hazard lights, microphone) to adjust the feature between a first state (e.g., off) and a second state (e.g., on).

The one or more human machine interface systems 118 can be configured to allow interaction between a user (e.g., human), the vehicle 104 (e.g., the vehicle computing system 108), and/or a third party (e.g., an operator associated with the service provider). The one or more human machine interface systems 118 can include a variety of interfaces for the user to input and/or receive information from the vehicle computing system 108. For example, the one or more human machine interface systems 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The one or more human machine interface systems 118 can include one or more input devices (e.g., touchscreens, keypad, touchpad, knobs, buttons, sliders, switches, mouse, gyroscope, microphone, other hardware interfaces) configured to receive user input. The one or more human machine interfaces 118 can also include one or more output devices (e.g., display devices, speakers, lights) to receive and output data associated with the interfaces.

The other vehicle systems 120 can be configured to control and/or monitor other aspects of the vehicle 104. For instance, the other vehicle systems 120 can include software update monitors, an engine control unit, transmission control unit, the on-board memory devices, etc. The one or more computing devices 110 can be configured to communicate with the other vehicle systems 120 to receive data and/or to send to one or more signals. By way of example, the software update monitors can provide, to the one or more computing devices 110, data indicative of a current status of the software running on one or more of the on-board systems and/or whether the respective system requires a software update.

The communications system 122 can be configured to allow the vehicle computing system 108 (and its one or more computing devices 110) to communicate with other computing devices. In some implementations, the vehicle computing system 108 can use the communications system 122 to communicate with one or more user devices over the networks. In some implementations, the communications system 122 can allow the one or more computing devices 110 to communicate with one or more of the systems on-board the vehicle 104. The vehicle computing system 108 can use the communications system 122 to communicate with the operations computing system 150 and/or the one or more remote computing devices 130 over the networks (e.g., via one or more wireless signal connections). The communications system 122 can include any suitable components for interfacing with one or more networks, including for example, transmitters, receivers, ports, controllers, antennas, or other suitable components that can help facilitate communication with one or more remote computing devices that are remote from the vehicle 104.

In some implementations, the one or more computing devices 110 on-board the vehicle 104 can obtain vehicle data indicative of one or more parameters associated with the vehicle 104. The one or more parameters can include information, such as health and maintenance information, associated with the vehicle 104, the vehicle computing system 108, one or more of the on-board systems, etc. For example, the one or more parameters can include fuel level, engine conditions, tire pressure, conditions associated with the vehicle's interior, conditions associated with the vehicle's exterior, mileage, time until next maintenance, time since last maintenance, available data storage in the on-board memory devices, a charge level of an energy storage device in the vehicle 104, current software status, needed software updates, and/or other heath and maintenance data of the vehicle 104.

At least a portion of the vehicle data indicative of the parameters can be provided via one or more of the systems on-board the vehicle 104. The one or more computing devices 110 can be configured to request the vehicle data from the on-board systems on a scheduled and/or as-needed basis. In some implementations, one or more of the on-board systems can be configured to provide vehicle data indicative of one or more parameters to the one or more computing devices 110 (e.g., periodically, continuously, as-needed, as requested). By way of example, the one or more data acquisitions systems 112 can provide a parameter indicative of the vehicle's fuel level and/or the charge level in a vehicle energy storage device. In some implementations, one or more of the parameters can be indicative of user input. For example, the one or more human machine interfaces 118 can receive user input (e.g., via a user interface displayed on a display device in the vehicle's interior). The one or more human machine interfaces 118 can provide data indicative of the user input to the one or more computing devices 110. In some implementations, the one or more computing devices 130 can receive input and can provide data indicative of the user input to the one or more computing devices 110. The one or more computing devices 110 can obtain the data indicative of the user input from the one or more computing devices 130 (e.g., via a wireless communication).

The one or more computing devices 110 can be configured to determine the state of the vehicle 104 and the environment around the vehicle 104 including the state of one or more objects including passengers (e.g., individuals inside the vehicle or waiting to enter the vehicle) and cargo including articles of perishable cargo or non-perishable cargo. Further, the one or more computing devices 110 can be configured to determine physical properties of the one or more objects including the mass, weight, volume, density, or shape of the one or more objects. The one or more computing devices 110 can compare values associated with the physical properties of the one or more objects, to a set of one or more values associated with the vehicle 104 including a carrying capacity value associated with the amount of mass, weight, or volume that the vehicle 104 can carry.

Figure 2:
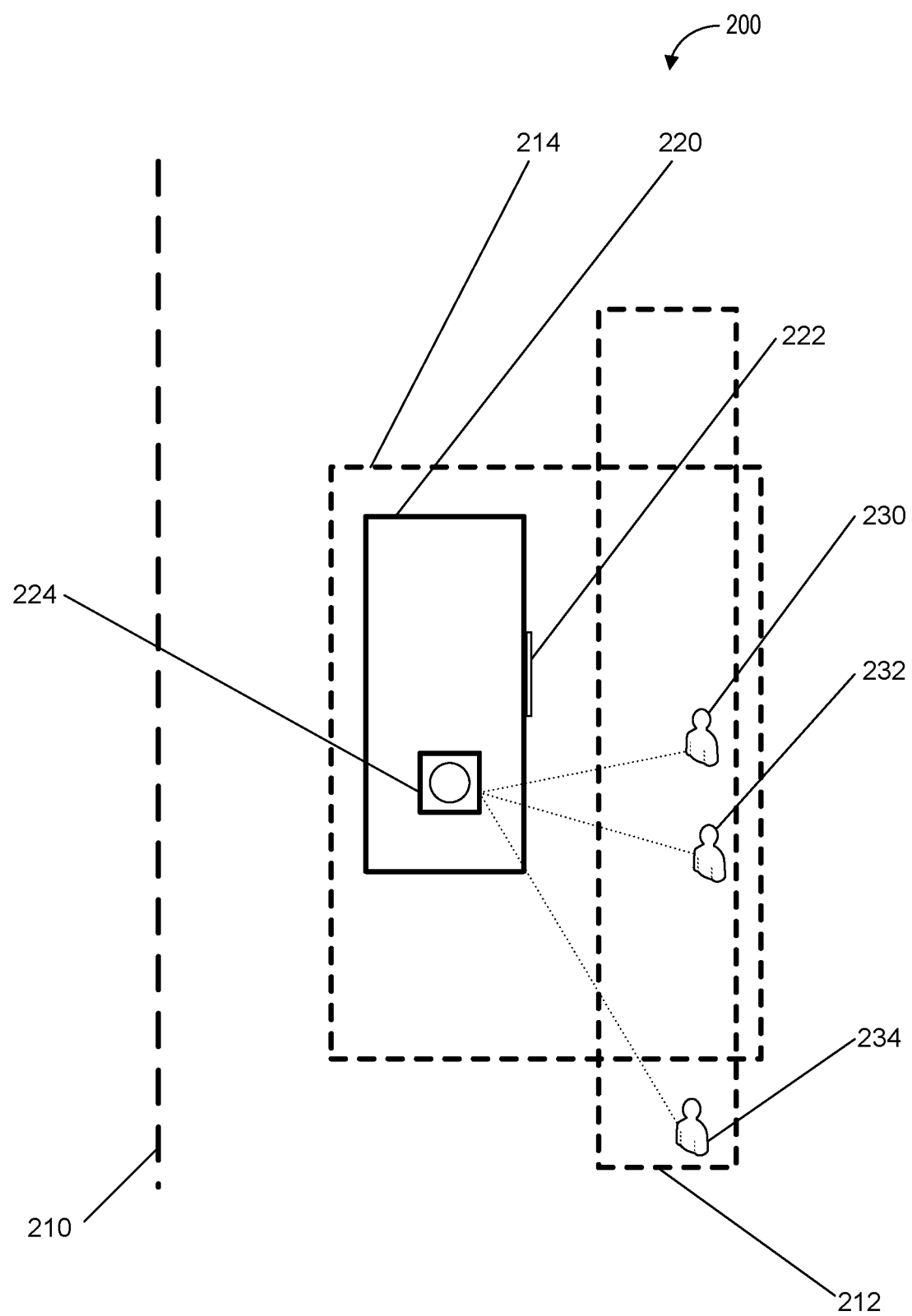
FIG. 2 depicts a diagram of an environment including an example of identity determination by a vehicle control system according to example embodiments of the present disclosure.

FIG. 2 depicts a diagram of an environment 200 including an example of identity determination by a vehicle control system according to example embodiments of the present disclosure. The environment 200 illustrates a lane marker 210, a pedestrian area 212, a loading location 214, a vehicle 220, a vehicle entrance 222, a vehicle control system 224, a pedestrian 230, 232, and 234.

In the environment 200, the vehicle 220 is parked (e.g., stationary) in a loading location 214, parallel to the lane marker 210, and adjacent to the pedestrian area 212 (e.g., a sidewalk). The loading location 214 is a location to which the vehicle 220 will travel and park so that it can pick-up or drop off one or more objects including a passenger or cargo. The loading location 214 can be communicated to the vehicle 220 by a remote computing device (not shown) via a network (e.g., a wireless network) and can include location data which can include geographic coordinates or other information associated with the environment or surroundings at which the vehicle 220 will pick-up or deliver the one or more objects.

The vehicle control system can include one or more sensors that can detect the presence of pedestrians including the pedestrian 230, 232, and 234. For example, a combination of motion sensors and cameras in the vehicle control system 224 can detect and capture one or more images of the pedestrians. Based on the one or more images captured by the vehicle control system 224, the vehicle 220 can determine (e.g., through the use of facial recognition) that pedestrian 232 and pedestrian 234 are passengers that will be permitted to access the vehicle via the entrance 222 (e.g., a door) and that the pedestrian 230 is not a passenger and will not be permitted to access the vehicle via the entrance 222.

Based on the determination of by the vehicle 220, that the pedestrian 232 and the pedestrian 234 are passengers, the vehicle can allow access to the vehicle 220 by unlocking or opening the entrance 222 to allow the pedestrian 232 and the pedestrian 234 to enter the vehicle 220. In some implementations, the vehicle 220 can provide pedestrians with cues (e.g., audio cues including spoken instructions or visual cues including written instructions) to indicate that the vehicle 220 is picking up or dropping off passengers or cargo. Further, the vehicle 220 can generate instructions to indicate to passengers that access to the vehicle 220 is allowed and can indicate to non-passengers that access to the vehicle 220 is not allowed. The vehicle 220 can reduce its available carrying capacity based on the determined mass or volume of the pedestrian 232 and 234.

Based on the determination that the pedestrian 232 and 234 will enter into the vehicle 220, the vehicle 220 can modify available vehicle carrying capacity data associated with the available carrying capacity of the vehicle 220 (e.g., how much additional mass or volume the vehicle 220 can carry). The modification of the available vehicle carrying capacity data can include reducing an available vehicle carrying capacity value based on the mass or volume occupied by the two passengers (e.g., pedestrian 232 and 234).

Figure 3:
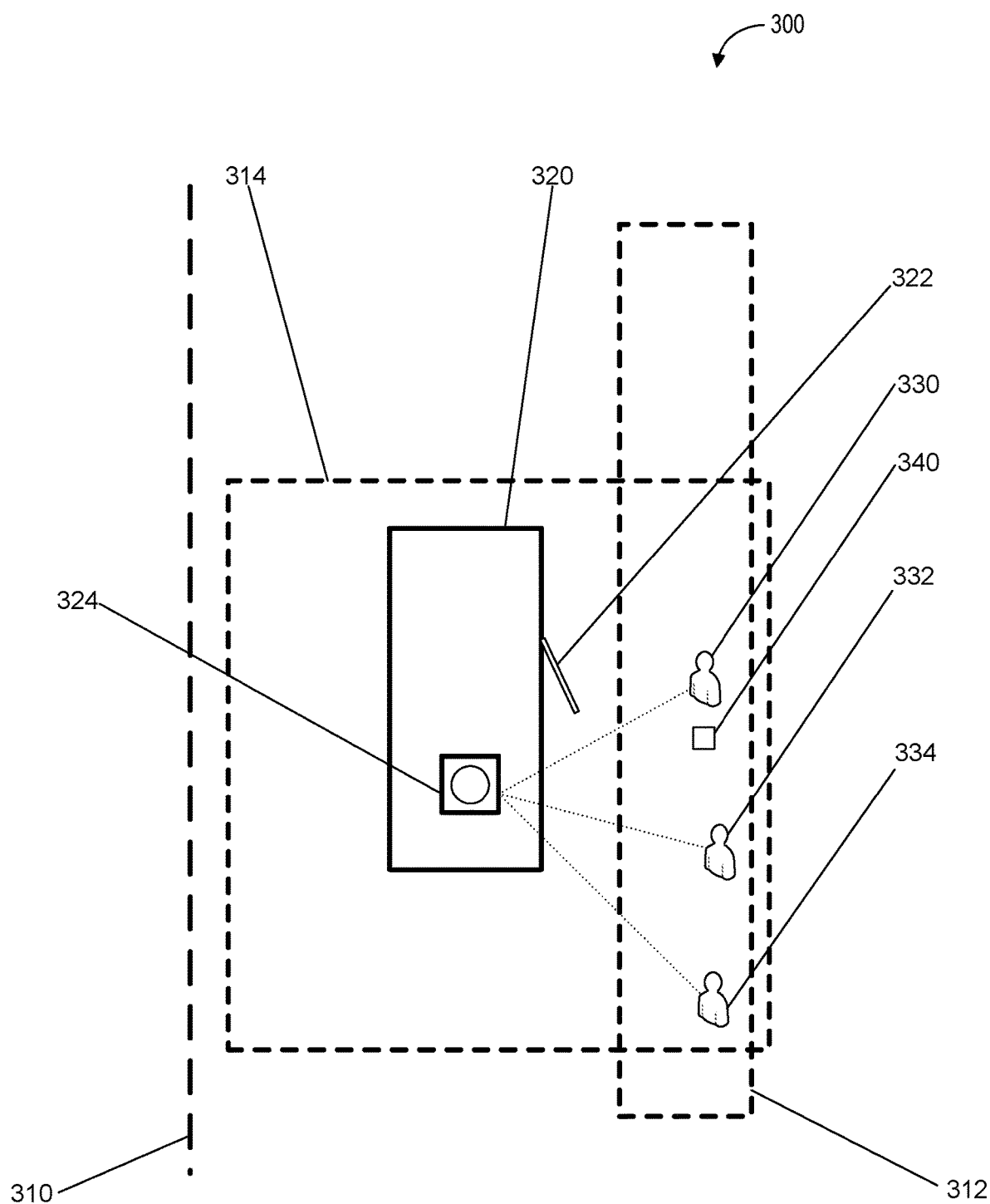
FIG. 3 depicts a diagram of an environment including an example of activating a vehicle access system according to example embodiments of the present disclosure.

FIG. 3 depicts a diagram of an environment 300 including an example of activating a vehicle access system according to example embodiments of the present disclosure. The environment 300 illustrates a lane marker 310, a pedestrian area 312, a loading location 314, a vehicle 320, a vehicle entrance 322, a vehicle access system 324, a pedestrian 330, 332, and 334; and a food container 340.

In the environment 300, the vehicle 320 has come to a stop in a loading location 314, parallel to the lane marker 310, and adjacent to the pedestrian area 312 (e.g., a sidewalk). The loading location 314 is a location to which the vehicle 320 will travel and park so that it can pick-up or drop off one or more objects including a passenger or cargo. The loading location 314 can be communicated to the vehicle 320 by a remote computing device (not shown) via a network (e.g., a wireless network) and includes location data such as geographic coordinates or other information associated with the passengers or cargo that the vehicle 320 will pick-up or deliver at the loading location 314.

The vehicle access system 324 can include one or more sensors that can detect the presence of pedestrians including the pedestrian 330, 332, and 334. For example, a combination of motion sensors and cameras in the vehicle access system 324 can detect and capture one or more images of the pedestrians. Based on the one or more images captured by the vehicle access system 324, the vehicle 320 can determine (e.g., through the use of facial recognition) that pedestrian 330 and pedestrian 332 are passengers that will be permitted to access the vehicle via the entrance 322 (e.g., a door) and that the pedestrian 334 is not a passenger and will not be permitted to access the vehicle via the entrance 322. Accordingly, the vehicle access system 324 can generate instructions for the pedestrian 332 to sit further away from the food container 340 than pedestrian 330.

Further, the vehicle 330 determines based on the passenger information included in the location data that pedestrian 330 is delivering several hot food items in a food container 340. Based on the determination that the pedestrian 330 is carrying hot food items, the vehicle 320 can modify available vehicle carrying capacity data associated with the available carrying capacity of the vehicle 320 (e.g., how much additional mass or volume the vehicle 320 can carry). The modification of the available vehicle carrying capacity data can include reducing an available vehicle carrying capacity value based on the volume occupied by the two passengers (e.g., pedestrian 330 and 332) and the volume of the food container 340 carrying the hot food items.

Figure 4:
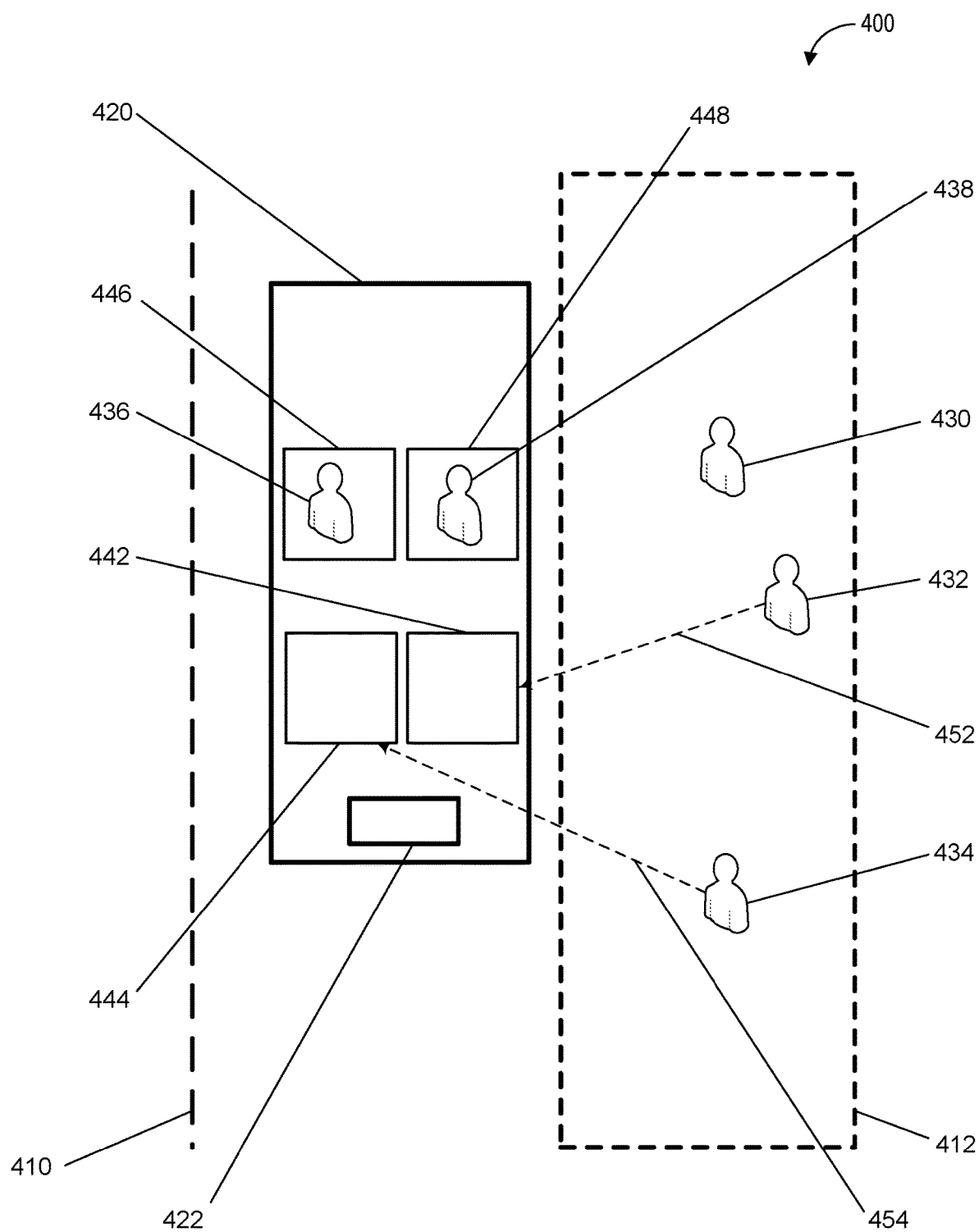
FIG. 4 depicts a diagram of an environment including an example of determining an order of ingress or egress according to example embodiments of the present disclosure.

FIG. 4 depicts a diagram of an environment 400 including an example of determining an order of ingress or egress according to example embodiments of the present disclosure. The environment 400 illustrates a lane marker 410, a pedestrian area 412, a vehicle 420, a vehicle notification system 422, a pedestrian 430, 432, 434, 436, and 438, a seating area 442, 444, 446, 448, a passenger path 452, and a passenger path 454.

In the environment 400, the vehicle 420 (e.g., an autonomous vehicle) has a compartment (e.g., a passenger or cargo cabin) that includes seating area 442, 444, 446, and 448, in which one or more objects (e.g., passengers or cargo) can be seated or placed. Seating area 446 is occupied by pedestrian 436 and seating area 448 is occupied by pedestrian 438. Seating area 442 and seating area 444 are vacant (not occupied by a passenger or cargo). The vehicle 420 can determine an order in which the one or more objects can enter or exit the vehicle 420. The order in which the one or more objects can enter or exit the vehicle can be based on the position of the vehicle 420 in relation to one or more objects including the lane marker 410, the pedestrian area 412, and the pedestrian 430, 432, 434, 436, and 438.

In this example, pedestrian 438 and 438 are seated and were in the vehicle 420 after previously being picked up at another location. Based on output from one or more sensors (not shown), the vehicle 420 can determine that pedestrian 432 is a child and that pedestrian 434 is an adult. To facilitate safe and efficient entry into the vehicle, the vehicle notification system 422 can generate instructions indicating that pedestrian 432 should enter the vehicle before pedestrian 434 (e.g., pedestrian 434 can assist in the seating of pedestrian 432 into the vehicle 420). The vehicle 420 can modify available vehicle carrying capacity data associated with the available carrying capacity of the vehicle 420. The modification to the available vehicle carrying capacity data can include reducing an available vehicle carrying capacity value to indicate that the available carrying capacity of the vehicle has been reduced based on the added mass and volume of the pedestrian 432 and 434.

Further, the vehicle 420 can determine that pedestrian 438 has arrived at his drop-off location and that pedestrian 430 is not a scheduled passenger. The vehicle 420 can generate an indication (e.g., an audio instruction) to inform pedestrian 438 that he has arrived at his drop-off location and that he can leave the vehicle 420. The vehicle 420 can adjust the available vehicle carrying capacity data based on the mass and volume that is no longer taken up by pedestrian 438.

Figure 5:
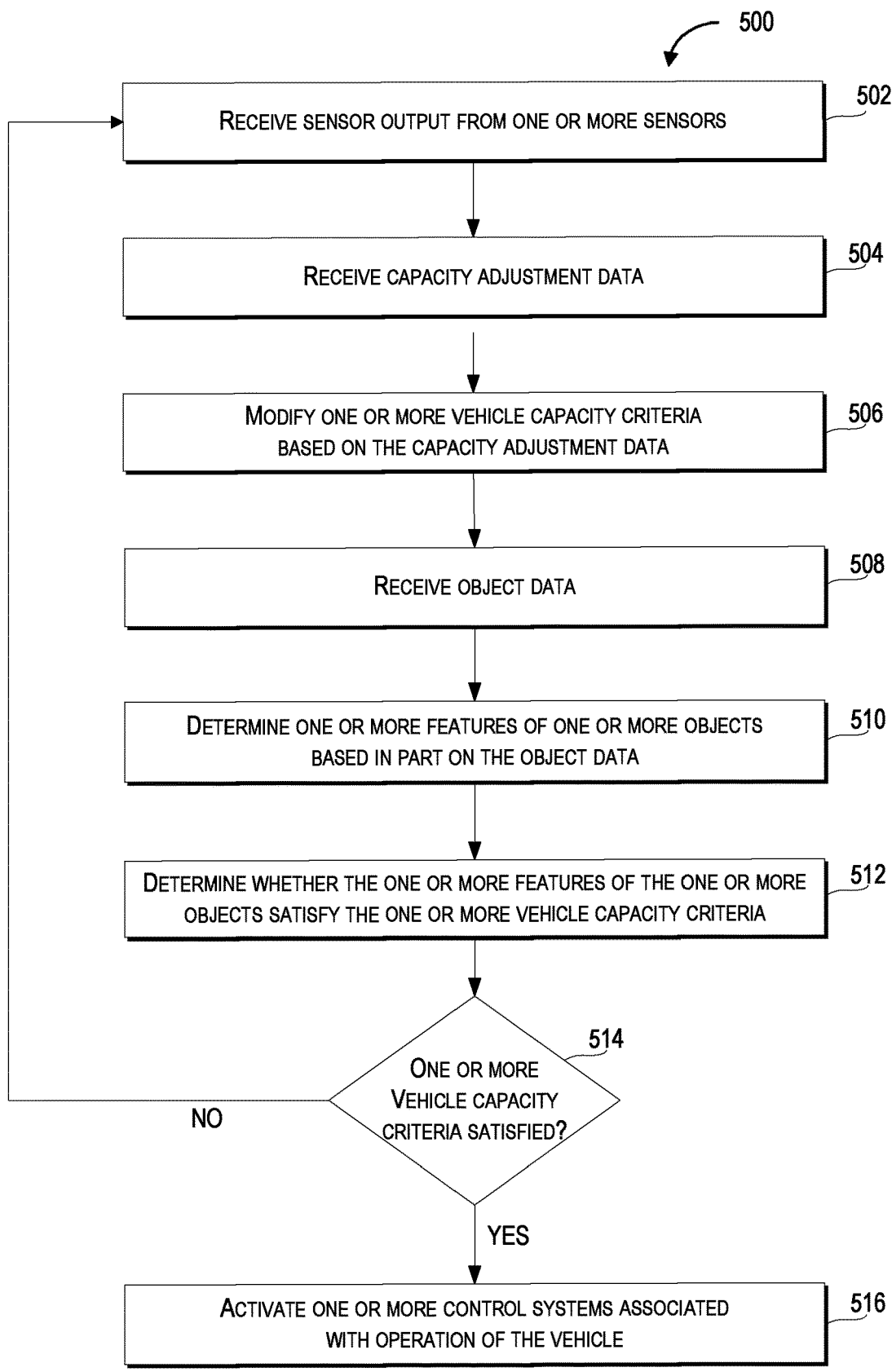
FIG. 5 depicts a flow diagram of an example method of capacity based autonomous vehicle operation according to example embodiments of the present disclosure.

FIG. 5 depicts a flow diagram of an example method 500 of capacity based autonomous vehicle operation according to example embodiments of the present disclosure. One or more portions of the method 500 can be implemented by one or more devices (e.g., one or more computing devices) or systems including, for example, the vehicle 104, the vehicle computing system 108, or the operations computing system 150, shown in FIG. 1. Moreover, one or more portions of the method 500 can be implemented as an algorithm on the hardware components of the devices described herein (e.g., as in FIG. 1) to, for example, determine a vehicle carrying capacity. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502 the method 500 can include receiving output (e.g., electronic signals including data) from an output source including a vehicle including an autonomous vehicle; one or more components of a vehicle including one or more sensors of an autonomous vehicle, or one or more remote computing devices (e.g., mobile computing devices including smart phones). The output can include sensor output from one or more sensors (e.g., optical sensors) or access output from a vehicle access system (e.g., a computing device that controls access or entry to the vehicle).

The sensor output can include sensor signals or sensor data based on the state or condition of the vehicle (e.g., the state of the autonomous vehicle) or the environment external to the vehicle, including the state or condition of one or more objects (e.g., passengers, cargo, or buildings) in the environment external to the vehicle. For example, the sensor signals or the sensor data can be associated with one or more objects (e.g., passengers or cargo) including the size, number, and physical state or characteristics (e.g., mass, weight, volume, or temperature) of the one or more objects in the environment within a threshold distance of the vehicle.

In some implementations, the one or more sensors can be located on an exterior of the vehicle (e.g., on the hood, roof, or door exteriors of the autonomous vehicle) or an interior of the vehicle (e.g., within the autonomous vehicle passenger compartment, the chassis of the autonomous vehicle, or the engine) and can include an optical sensor (e.g., a camera or LIDAR); an audio sensor (e.g., a microphone); a tactile sensor (e.g., a pressure sensor or a piezoresistive sensor); a temperature sensor (e.g., a thermometer); or an electromagnetic sensor (e.g., a capacitive sensor or piezoelectric sensor).

The access output from the vehicle access system can include access output signals (e.g., electric signals) or access output data which can include signals or data that is used to control access to some portion of the vehicle (e.g., a passcode that is used to lock or unlock an entrance of the autonomous vehicle, the entrance including a door, window, or trunk). The access output signals or access output data can be encrypted and can be received from the vehicle access system which can exchange (send or receive) data with one or more remote computing systems (e.g., mobile computing devices of vehicle passengers or remote server computing devices).

In some implementations, the vehicle access system may be accessed by a device, including a pass card or a pass key, that may be used to gain access to some portion of the vehicle (e.g., autonomous vehicle) through physical contact (e.g., inserting a key to unlock an entrance of the autonomous vehicle) or contactless interaction (e.g., wirelessly transmitting a passcode to unlock an entrance of the autonomous vehicle).

At 504 the method 500 can include receiving capacity adjustment data. The capacity adjustment data can include data that is used to adjust or modify the carrying capacity of the vehicle. The carrying capacity of the vehicle can be based on any state, property (e.g., measurable property), or condition of the one or more objects including the amount or quantity of the one or more objects that the vehicle can carry, bear, or transport. For example, the carrying capacity can include a number of the one or more objects (e.g., a number of passengers or articles of cargo); or a quantity associated with the one or more objects (e.g., a mass, weight, volume, or density of the one or more objects).

Further, the capacity adjustment data can include data associated with factors that can effect or modify the carrying capacity of the vehicle. For example, the capacity adjustment data can include data associated with a route for the vehicle (e.g., autonomous vehicle) to travel (e.g., a route for a cargo vehicle through a cargo vehicle weighing station may affect the carrying capacity of the cargo vehicle); topographical conditions (e.g., a route that passes through very hilly terrain can reduce carrying capacity); road conditions (e.g., a dirt road or a heavily pitted road may reduce carrying capacity); or weather conditions (e.g., snow covered or rain slickened roads can reduce carrying capacity).

At 506 the method 500 can include modifying one or more vehicle capacity criteria based on the capacity adjustment data. The one or more vehicle capacity criteria can be associated with one or more features or characteristics of the one or more objects and can include one or more criteria that the carrying capacity of the vehicle is based on. The one or more vehicle capacity criteria can include one or more capacity criteria values (e.g., threshold values) that can, individually or in combination, represent the carrying capacity of the vehicle. Modifying the one or more vehicle capacity criteria can include increasing or decreasing the one or more capacity criteria values associated with the one or more vehicle capacity criteria. For example, a vehicle with a carrying capacity value of 800 kilograms (800 kg) could have the carrying capacity value decreased (i.e., modified downwards) by one-hundred kilograms (100 kg) to a value of seven-hundred kilograms (700 kg) based on capacity adjustment data that indicates the vehicle route will traverse hilly terrain during a snow-storm.

At 508 the method 500 can include receiving object data from a source including the vehicle (e.g., an autonomous vehicle), one or more components of a vehicle (e.g., one or more sensors of the autonomous vehicle), or one or more remote computing devices (e.g., mobile computing devices including wearable devices). The object data can be based in part on the one or more states, conditions, or characteristics of the one or more objects and can include or be associated with the sensor output (e.g., sensor data) or the access output (e.g., access output data). The state or condition of the one or more objects can include a physical state, condition, or characteristic of the one or more objects (e.g., mass, weight, size, based on output from one or more sensors); or an identifying state, condition, or characteristic associated with the one or more objects including an object identifier (e.g., a personal name or the serial number of an article of cargo) or an object classification (e.g., classifying an object as a passenger or classifying cargo as perishable or non-perishable).

At 510 the method 500 can include determining, based in part on the object data, one or more features of the one or more objects. The one or more features of the one or more objects can be based on, or associated with, portions or combinations of the object data. For example, a density feature of the one or more objects can be determined on the basis of a combination of object data including a mass of an object based on mass sensors data of the object data and a volume of the object based on optical sensors used to determine the object's volume. Further, the one or more features can be the result of one or more associations of the object data to feature data associated with the one or more objects. For example, the name of a passenger can be determined based on feature data that includes the name of a passenger associated with object data including a visual image of the passenger.

In some implementations, the one or more features can include a number of the one or more objects (e.g., a number of passengers); one or more identities of the one or more objects (e.g., the names of passengers); a weight or mass of the one or more objects (e.g., a weight in pounds or a mass in kilograms); a distribution throughout the vehicle (e.g., autonomous vehicle) of the weight or mass of the one or more objects; a volume of the one or more objects, an electrostatic capacitance of the one or more objects; a texture of the one or more objects (e.g., the sharpness, roughness, or smoothness of an object); or a shape of the one or more objects.

At 512 the method 500 can include, determining whether, or that, the one or more objects satisfy the one or more vehicle capacity criteria. The determination of whether, or determining that, the one or more objects satisfy the one or more vehicle capacity criteria can be based on a comparison of the one or more features of the one or more objects to one or more vehicle capacity criteria. The comparison of the one or more features can include a comparison of one or more portions of feature data associated to vehicle capacity criteria data associated with the one or more vehicle capacity criteria. For example, the comparison of the one or more features can include a determination of whether one or more feature values associated with the one or more features is equal to, less than, or greater than one or more vehicle capacity criteria values associated with the one or more vehicle capacity criteria.

In some implementations, the one or more vehicle capacity criteria can be based in part on a carrying capacity of a vehicle (e.g., an autonomous vehicle). For example, the one or more vehicle capacity criteria can include a maximum mass criterion of one-thousand kilograms and a maximum volume criterion of three-thousand liters. In the preceding example, satisfying the one or more vehicle capacity criteria would require satisfying both the maximum mass criterion (e.g., a mass less than or equal to one-thousand kilograms) and the maximum volume criterion (e.g., a volume less than or equal to three-thousand liters).

At 514, responsive to determining that the one or more objects satisfy the one or more vehicle capacity criteria, the method 500 continues to 516. Responsive to determining that the one or more objects do not satisfy the one or more vehicle capacity criteria, the method 500 can return to 502 or end.

At 516 the method 500 can include performance of one or more actions including activating one or more control systems associated with operation of the vehicle (e.g., autonomous vehicle). Activating the one or more control systems can include activating control systems that can modify access to the vehicle (e.g., locking or unlocking vehicle doors); or adjust the carrying capacity of the vehicle (e.g., moving or folding down seats to provide space for cargo).

For example, activating the one or more control systems can include activating any of a vehicle access system (e.g., a system that controls access to portions of the vehicle including the passenger compartment); a vehicle notification system (e.g., a system that provides visual, auditory, or haptic notifications to one or more passengers of the vehicle); a vehicle communication system (e.g., a system that communicates with one or more devices including remote computing systems); a vehicle suspension system (e.g., a system that controls the shock absorbers and other suspension systems of the vehicle); or a vehicle propulsion system (e.g., a system that controls movement of the vehicle).

Figure 6:
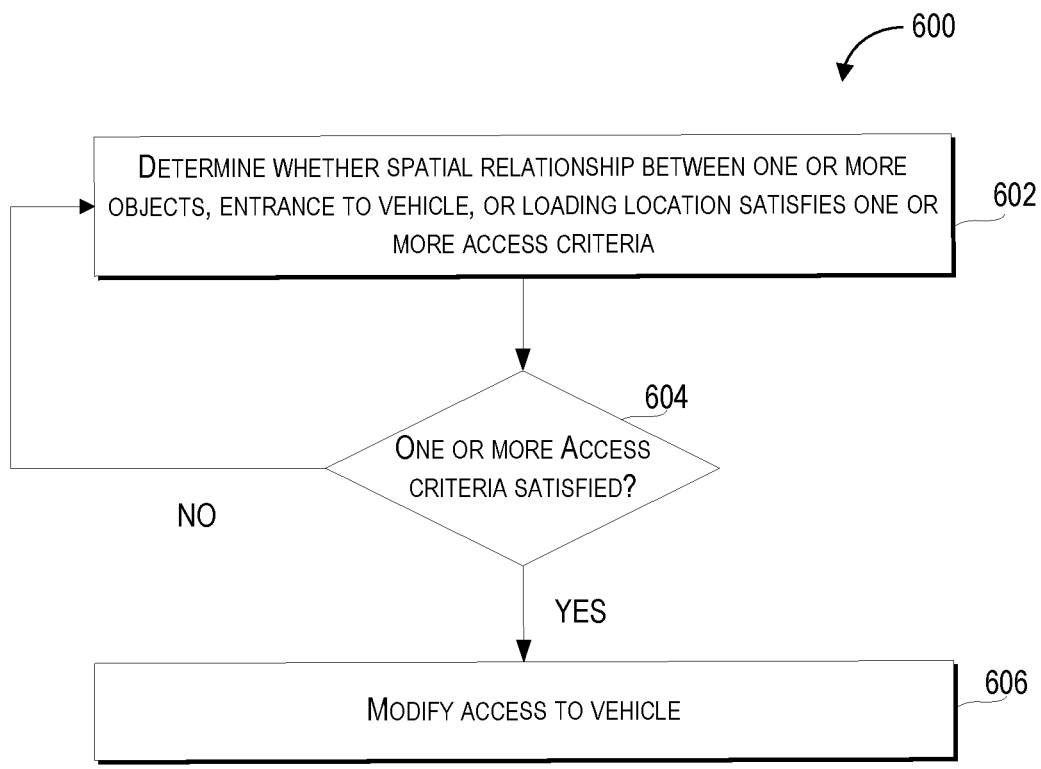
FIG. 6 depicts a flow diagram of an example method of capacity based autonomous vehicle operation according to example embodiments of the present disclosure.

FIG. 6 depicts a flow diagram of an example method 600 of capacity based autonomous vehicle operation according to example embodiments of the present disclosure. One or more portions of the method 600 can be implemented by one or more devices (e.g., one or more computing devices) or systems including, for example, the vehicle 104, the vehicle computing system 108, or the operations computing system 150, shown in FIG. 1. Moreover, one or more portions of the method 600 can be implemented as an algorithm on the hardware components of the devices described herein (e.g., as in FIG. 1) to, for example, determine a vehicle carrying capacity. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602 the method 600 can include activating a vehicle access system (e.g., the vehicle access system in method 500) which can include, determining whether, or determining that, a spatial relationship between one or more objects, an entrance to a vehicle (e.g., an autonomous vehicle), or a loading location external to the vehicle, satisfies one or more access criteria. The one or more objects can include passengers or cargo; the entrance to the vehicle can include a door, window, or trunk of the vehicle; and a loading location external to the vehicle can include an area in which the vehicle (e.g., autonomous vehicle) can pick-up or drop off the one or more objects (e.g., an area on a road or a loading bay in factory).

The spatial relationship can include a relationship based on any combination of a size, area, or volume of the one or more objects, the entrance of the vehicle (e.g., autonomous vehicle), or the loading location; or a distance between the one or more objects, the entrance of the vehicle (e.g., autonomous vehicle), or the loading location. For example, the spatial relationship can include a distance between a passenger from the door of a vehicle (e.g., autonomous vehicle); the cross-sectional area of a package in relation to the area of a doorway of the vehicle (e.g., autonomous vehicle); or a distance between two or more passengers.

In some implementations, the spatial relationship can be based on various data including output (e.g., sensor data) from one or more sensors of the vehicle including an autonomous vehicle (e.g., optical sensors or LIDAR), or spatial relationship data from a remote computing device (e.g., a dispatch center computing device sending an indication of the physical dimensions of a package to be loaded onto the autonomous vehicle).

The one or more access criteria can include the one or more vehicle capacity criteria and can be based on physical properties or attributes of the relationship between the one or more objects, the entrance of the vehicle (e.g., autonomous vehicle), or the loading location, including any combination of a size, area, or volume of the one or more objects, the entrance of the vehicle (e.g., autonomous vehicle), or the loading location; or a distance between the one or more objects, the entrance of the vehicle (e.g., autonomous vehicle), or the loading location.

In some implementations, the one or more access criteria can be based in part on a threshold distance between the entrance and the loading location including a minimum distance, a maximum distance, or a distance range that is used as part of the one or more access criteria (e.g., a distance between an entrance, such as a trunk door, and a loading location, such as the curb of a sidewalk); a threshold distance including a minimum distance, a maximum distance, or a distance range, between the entrance and the one or more objects (e.g., a distance between an entrance, such as a door, and an object such as a passenger); or an orientation of the entrance relative to the loading location (e.g., an entrance such as a door being oriented parallel to, and facing, the curb of a sidewalk).

At 604 the method 600, responsive to determining that the spatial relationship satisfies the one or more access criteria, continues to 606. Responsive to determining that the spatial relationship does not satisfy the one or more access criteria, the method 600 can return to 602 or end.

At 606 the method 600 can modify access to the vehicle (e.g., autonomous vehicle). Modifying access to the vehicle (e.g., autonomous vehicle) can include various actions including activating or deactivating vehicle control systems that control ingress (e.g., entry or placement of an object into the vehicle) or egress (e.g., exit or removal of an object from the vehicle) of the one or more objects to or from the vehicle (e.g., autonomous vehicle).

For example, modifying access to the vehicle (e.g., autonomous vehicle) can include locking an entrance to the vehicle (e.g., autonomous vehicle) including activating a locking mechanism on a door of the autonomous vehicle); unlocking an entrance to the vehicle (e.g., autonomous vehicle) including deactivating a locking mechanism on a trunk opening of the autonomous vehicle); opening an entrance to the vehicle (e.g., autonomous vehicle) including activating a motor that opens a door of the vehicle; closing an entrance to the vehicle (e.g., autonomous vehicle) including activating a motor that opens a window of the vehicle; activating a restraint system of the vehicle (e.g., autonomous vehicle) including activating a cargo or passenger restraint system of the vehicle including locking a passenger's seatbelt in the vehicle while the vehicle is in transit; or deactivating a restraint system of the vehicle (e.g., autonomous vehicle) including deactivating a cargo or passenger restraint system of the vehicle including unlocking a passenger's seatbelt in the vehicle when the vehicle has arrived at its destination and come to a halt.

Figure 7:
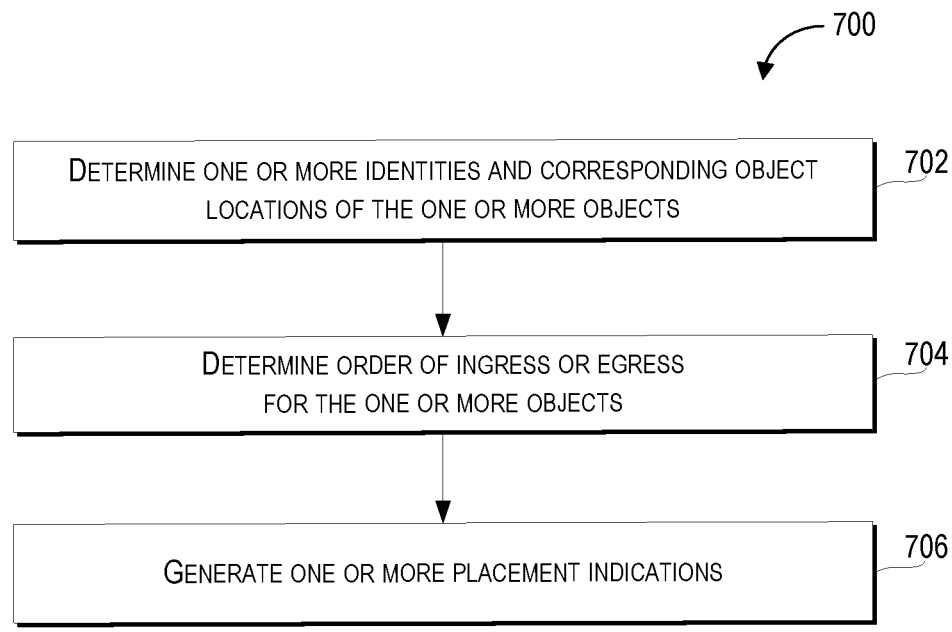
FIG. 7 depicts a flow diagram of an example method of capacity based autonomous vehicle operation according to example embodiments of the present disclosure.

FIG. 7 depicts a flow diagram of an example method 700 of capacity based autonomous vehicle operation according to example embodiments of the present disclosure. One or more portions of the method 700 can be implemented by one or more devices (e.g., one or more computing devices) or systems including, for example, the vehicle 104, the vehicle computing system 108, or the operations computing system 150, shown in FIG. 1. Moreover, one or more portions of the method 700 can be implemented as an algorithm on the hardware components of the devices described herein (e.g., as in FIG. 1) to, for example, determine a vehicle carrying capacity. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702 the method 700 can include activating a vehicle notification system (e.g., the vehicle notification system in method 500), which can include, determining, based in part on the one or more features of the one or more objects, one or more identities and corresponding object locations of the one or more objects. The one or more identities can include any identifying data (e.g., an identifier) associated with the one or more objects including an object name (e.g., the name of a person) or an object type (e.g., a category of an object such as a passenger type or type of cargo such as perishable cargo or non-perishable cargo). The corresponding object locations of the one or more objects can include a geographical location (e.g., latitude and longitude) or a relative position of the one or more objects (e.g., the position of the one or more objects relative to a point of reference such as the entrance of the vehicle or another one of the one or more objects).

At 704 the method 700 can include, determining an order of ingress or egress for the one or more objects. The order of ingress or egress is the order in which the one or more objects can enter or exit the vehicle (e.g., autonomous vehicle). The order of ingress or egress can include any combination of the one or more objects entering or exiting the vehicle (e.g., autonomous vehicle). For example, the order of ingress or egress for the one or more objects can include a passenger exiting the vehicle (e.g., autonomous vehicle) followed by cargo being placed on the seat formerly occupied by the passenger; three passengers entering the vehicle from three different doors; or three articles of cargo being sequentially loaded into the vehicle from a single door.

In some implementations, the order of ingress or egress can be determined based on the one or more identities and the corresponding object locations. For example, the order of ingress or egress can be determined based on the location of passengers and cargo in the vehicle (e.g., autonomous vehicle) such that passengers are scheduled to exit the vehicle before cargo is removed from the vehicle. Further, by way of example, order of ingress or egress for passengers can be based on their proximity to an entrance of the vehicle.

At 706 the method 700 can include, generating one or more placement indications including instructions for directing movement of the one or more objects to one or more assigned locations in the vehicle (e.g., autonomous vehicle). Generation of the one or more placement indications can be based in part on one or more object placement criteria (e.g., hot food items like pizza are not placed next to cold food items like ice-cream); the one or more identities of the one or more objects including the names of passengers; and the corresponding object locations including the object locations of the one or more objects within the vehicle (e.g., the seating position of passengers within the vehicle).

The one or more placement indications can include any combination of written instructions (e.g., written instructions displayed on a display device on the interior or the exterior of the autonomous vehicle), symbolic instructions (e.g., arrows or other symbols displayed on a portion of the autonomous vehicle), or auditory instructions (e.g., audio instructions generated by a loudspeaker in, or on, the vehicle). In some implementations, the one or more object placement criteria can be based in part on the order of ingress or egress for the one or more objects (e.g., cargo that is due to be unloaded second is positioned not to block access to cargo that is due to be unloaded second).

Figure 8:
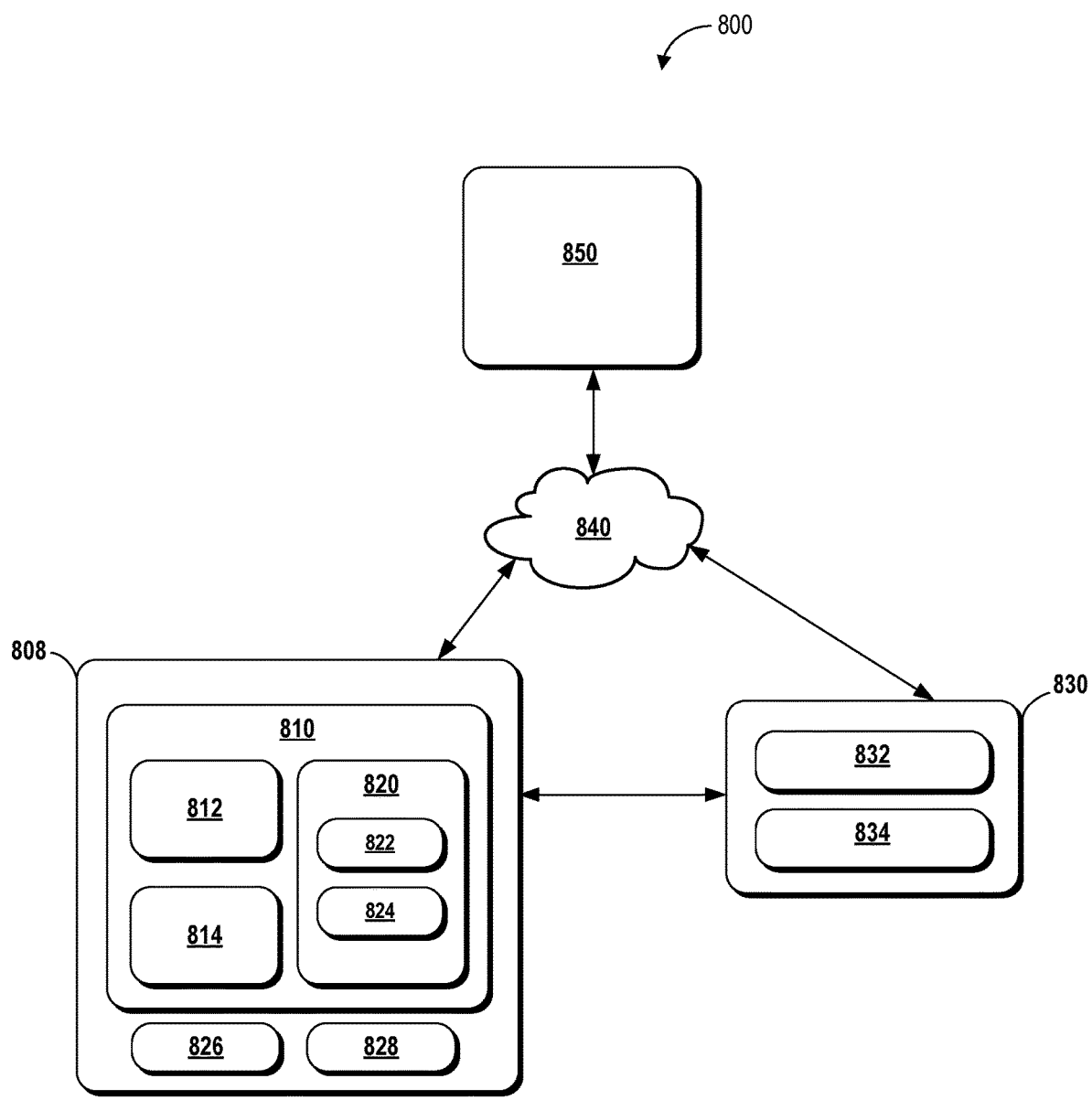
FIG. 8 depicts a diagram of an example system according to example embodiments of the present disclosure.

FIG. 8 depicts an example system 800 according to example embodiments of the present disclosure. The system 800 can include a vehicle computing system 808 which can include some or all of the features of the vehicle computing system 108 depicted in FIG. 1; one or more computing devices 810 which can include some or all of the features of the one or more computing devices 110; a communication interface 812; one or more processors 814; one or more memory devices 820; memory system 822; memory system 824; one or more input devices 826; one or more output devices 828; one or more computing devices 830 which can include some or all of the features of the one or more computing devices 130 depicted in FIG. 1; one or more input devices 832; one or more output devices 834; a network 840 which can include some or all of the features of the network 140 depicted in FIG. 1; and an operations computing system 850 which can include some or all of the features of the operations computing system 150 depicted in FIG. 1.

The vehicle computing system 808 can include the one or more computing devices 810. The one or more computing devices 810 can include one or more processors 814 which can be included on-board a vehicle including the vehicle 104 and one or more memory devices 820 which can be included on-board a vehicle including the vehicle 104. The one or more processors 814 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The one or more processors 814 can include a single processor or a plurality of processors that are operatively and/or selectively connected. The one or more memory devices 820 can include one or more non-transitory computer-readable storage media, such as RAM, ROM, EEPROM, EPROM, flash memory devices, magnetic disks, etc., and/or combinations thereof.

The one or more memory devices 820 can store data or information that can be accessed by the one or more processors 814. For instance, the one or more memory devices 820 which can be included on-board a vehicle including the vehicle 104, can include a memory system 822 that can store computer-readable instructions that can be executed by the one or more processors 814. The memory system 822 can include software written in any suitable programming language that can be implemented in hardware (e.g., computing hardware). Further, the memory system 822 can include instructions that can be executed in logically and/or virtually separate threads on the one or more processors 814. The memory system 822 can include any set of instructions that when executed by the one or more processors 814 cause the one or more processors 814 to perform operations.

For example, the one or more memory devices 820 which can be included on-board a vehicle including the vehicle 104 can store instructions, including specialized instructions, that when executed by the one or more processors 814 on-board the vehicle cause the one or more processors 814 to perform operations such as any of the operations and functions of the one or more computing devices 810 or for which the one or more computing devices 810 are configured, as described herein, the operations for receiving data (e.g., object data or capacity adjustment data), modifying one or more vehicle capacity criteria, determining one or more features of one or more objects, activating one or more vehicle control systems (e.g., one or more portions of methods 500, 600, or 700), or any other operations or functions for capacity based vehicle operation, as described herein.

The one or more memory devices 820 can include a memory system 824 that can store data that can be retrieved, manipulated, created, and/or stored by the one or more computing devices 810. The data stored in memory system 824 can include, for instance, data associated with a vehicle including the vehicle 104, data acquired by the one or more data acquisition systems 112, map data, data associated with a vehicle carrying capacity, data associated with user input, data associated with one or more actions and/or control command signals, data associated with users, and/or other data or information. The data in the memory system 824 can be stored in one or more databases. The one or more databases can be split up so that they are located in multiple locales on-board a vehicle which can include the vehicle 104. In some implementations, the one or more computing devices 810 can obtain data from one or more memory devices that are remote from a vehicle which can include the vehicle 104.

The environment 800 can include the network 840 (e.g., a communications network) which can be used to exchange (send or receive) signals (e.g., electronic signals) or data (e.g., data from a computing device) including signals or data exchanged between computing devices including the operations computing system 850, the vehicle computing system 808, or the one or more computing devices 830. The network 840 can include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 104.

The one or more computing devices 810 can also include communication interface 812 used to communicate with one or more other systems which can be included on-board a vehicle including the vehicle 104 (e.g., over the network 840. The communication interface 812 can include any suitable components for interfacing with one or more networks, including for example, transmitters, receivers, ports, controllers, antennas, or other suitable hardware and/or software.

The vehicle computing system 808 can also include one or more input devices 826 and/or one or more output devices 828. The one or more input devices 826 and/or the one or more output devices 828 can be included and/or otherwise associated with a human-machine interface system. The one or more input devices 826 can include, for example, hardware for receiving information from a user, such as a touch screen, touch pad, mouse, data entry keys, speakers, a microphone suitable for voice recognition, etc. The one or more output devices 828 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 104 via at least one of the display devices and the audio output devices.

The one or more computing devices 830 can include various types of computing devices. For example, the one or more computing devices 830 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more computing devices 830 can be associated with a user (e.g., 136). The one or more computing devices 830 described herein can also be representative of a user device that can be included in the human machine interface system of a vehicle including the vehicle 104.

The one or more computing devices 830 can include one or more input devices 832 and/or one or more output devices 834. The one or more input devices 832 can include, for example, hardware for receiving information from a user, such as a touch screen, touch pad, mouse, data entry keys, speakers, a microphone suitable for voice recognition, etc. The one or more output devices 834 can include hardware for providing content for display. For example, the one or more output devices 834 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of operating an autonomous vehicle, the computer-implemented method comprising:
   receiving, by a computing system comprising one or more computing devices, object data based in part on one or more states of one or more objects;
   determining, by the computing system, based in part on the object data, one or more features of the one or more objects, wherein the one or more features comprise a mass of each of the one or more objects;
   receiving, by the computing system, capacity adjustment data comprising weather conditions along a route for the autonomous vehicle to travel;
   adjusting, by the computing system, one or more vehicle capacity criteria based on the capacity adjustment data, wherein the one or more vehicle capacity criteria comprise a maximum mass the vehicle is allowed to carry;
   determining, by the computing system, based in part on the mass of each of the one or more objects, whether the one or more objects satisfy the one or more vehicle capacity criteria; and
   responsive to the one or more objects satisfying the one or more vehicle capacity criteria, activating, by the computing system, one or more control systems associated with operation of the autonomous vehicle.

2. The computer-implemented method of claim 1, wherein the adjusting, by the computing system, one or more vehicle capacity criteria based on the capacity adjustment data, wherein the one or more vehicle capacity criteria comprise a maximum mass the vehicle is allowed to carry comprises:
   reducing, by the computing system, the maximum mass the vehicle is allowed to carry when the weather conditions comprise rain or snow.

3. The computer-implemented method of claim 1, wherein the adjusting, by the computing system, one or more vehicle capacity criteria based on the capacity adjustment data, wherein the one or more vehicle capacity criteria comprise a maximum mass the vehicle is allowed to carry comprises:
   adjusting, by the computing system, the maximum mass the vehicle is allowed to carry, wherein adjusting the maximum mass the vehicle is allowed to carry comprises reducing the maximum amount of mass the vehicle is allowed to carry or increasing the amount of mass the vehicle is allowed to carry.

4. The computer-implemented method of claim 1, wherein the one or more features comprise a number of the one or more objects, one or more identities of the one or more objects, a weight of the one or more objects, a volume of the one or more objects, an electrostatic capacitance of the one or more objects, or a shape of the one or more objects.

5. The computer-implemented method of claim 1, wherein the activating, by the computing system, one or more control systems associated with operation of the autonomous vehicle comprises:

determining, by the computing system, whether a spatial relationship between the one or more objects, an entrance to the autonomous vehicle, or a loading location external to the autonomous vehicle satisfies one or more access criteria; and responsive to the spatial relationship satisfying the one or more access criteria, modifying, by the computing system, access to the autonomous vehicle, wherein the modifying access to the autonomous vehicle comprising locking the entrance, unlocking the entrance, opening the entrance, closing the entrance, activating a passenger restraint system, or deactivating a passenger restraint system.

6. The computer-implemented method of claim 5, wherein the one or more access criteria are based in part on a threshold distance between the entrance and the loading location, a threshold distance between the entrance and the one or more objects, or an orientation of the entrance relative to the loading location.

7. The computer-implemented method of claim 1, wherein the one or more vehicle carrying capacity criteria comprise a distribution throughout the autonomous vehicle of the mass of the one or more objects or a maximum volume the autonomous vehicle is allowed to carry.

8. The computer-implemented method of claim 1, wherein the determining, by the computing system, based in part on the mass of each of the one or more objects, whether the one or more objects satisfy the one or more vehicle capacity criteria comprises:

comparing, by the computing system, the mass of the one or more objects to the one or more vehicle capacity criteria.

9. The computer-implemented method of claim 1, wherein the capacity adjustment data comprises a route for the autonomous vehicle to travel, topographical conditions, or road conditions along the route.

10. The computer-implemented method of claim 1, wherein the one or more control systems comprise a vehicle access system, a vehicle notification system, a vehicle communication system, or a vehicle propulsion system.

11. The computer-implemented method of claim 1, wherein the autonomous vehicle is an aircraft.

12. One or more tangible, non-transitory computer-readable media storing computer-readable instructions that when executed by one or more processors cause the one or more processors to perform operations, the operations comprising:

receiving object data based in part on one or more states of one or more objects;

determining, based in part on the object data, one or more features of the one or more objects, wherein the one or more features comprise a mass of each of the one or more objects;

receiving capacity adjustment data comprising weather conditions along a route for the autonomous vehicle to travel;

adjusting one or more vehicle capacity criteria based on the capacity adjustment data, wherein the one or more vehicle capacity criteria comprise a maximum mass the vehicle is allowed to carry;

determining, based in part on the mass of each of the one or more objects, whether the one or more objects satisfy the one or more vehicle capacity criteria; and responsive to the one or more objects satisfying the one or more vehicle capacity criteria, activating one or more control systems associated with operation of the autonomous vehicle.

13. The one or more tangible, non-transitory computer-readable media of claim 12, wherein the one or more control systems comprise a vehicle access system, a vehicle notification system, a vehicle communication system, or a vehicle propulsion system.

14. The one or more tangible, non-transitory computer-readable media of claim 12, wherein the adjusting one or more vehicle capacity criteria based on the capacity adjustment data comprises:

adjusting the maximum mass the vehicle is allowed to carry, wherein the adjusting the maximum mass the vehicle is allowed to carry comprises reducing the maximum amount of mass the vehicle is allowed to carry or increasing the amount of mass the vehicle is allowed to carry.

15. The one or more tangible, non-transitory computer-readable media of claim 12, wherein the autonomous vehicle is an aircraft.

16. An autonomous vehicle comprising:

one or more processors;

one or more non-transitory computer-readable media storing instructions that when executed by the one or more processors cause the one or more processors to perform operations comprising:

receiving object data based in part on one or more states of one or more objects;

determining, based in part on the object data, one or more features of the one or more objects, wherein the one or more features comprise a mass of each of the one or more objects;

receiving capacity adjustment data comprising weather conditions along a route for the autonomous vehicle to travel;

adjusting one or more vehicle capacity criteria based on the capacity adjustment data, wherein the one or more vehicle capacity criteria comprise a maximum mass the vehicle is allowed to carry;

determining, based in part on the mass of each of the one or more objects, whether the one or more objects satisfy the one or more vehicle capacity criteria; and responsive to the one or more objects satisfying the one or more vehicle capacity criteria, activating one or more control systems associated with operation of the autonomous vehicle.

17. The autonomous vehicle of claim 16, wherein the adjusting one or more vehicle capacity criteria based on the capacity adjustment data, wherein the one or more vehicle capacity criteria comprise a maximum mass the vehicle is allowed to carry comprises:

reducing the maximum mass the vehicle is allowed to carry when the weather conditions comprise rain or snow.

18. The autonomous vehicle of claim 16, wherein the adjusting one or more vehicle capacity criteria based on the capacity adjustment data, wherein the one or more vehicle capacity criteria comprise a maximum mass the vehicle is allowed to carry comprises:

adjusting the maximum mass the vehicle is allowed to carry, wherein adjusting the maximum mass the vehicle is allowed to carry comprises reducing the maximum amount of mass the vehicle is allowed to carry or increasing the amount of mass the vehicle is allowed to carry.

19. The autonomous vehicle of claim 16, wherein the one or more features comprise a number of the one or more objects, one or more identities of the one or more objects, a weight of the one or more objects, a volume of the one or more objects, an electrostatic capacitance of the one or more objects, or a shape of the one or more objects.

20. The autonomous vehicle of claim 16, wherein the autonomous vehicle is an aircraft.

* * * * *